United States Patent
Krah

(10) Patent No.: US 10,333,449 B2
(45) Date of Patent: Jun. 25, 2019

(54) METHOD AND APPARATUS FOR OPERATING AN ELECTRIC MACHINE, ELECTRIC MACHINE

(71) Applicant: BECKHOFF AUTOMATION GMBH, Verl (DE)

(72) Inventor: Jens Onno Krah, Wuppertal (DE)

(73) Assignee: BECKHOFF AUTOMATION GMBH, Verl (DE)

(*) Notice: Subject to any disclaimer, the term of this patent is extended or adjusted under 35 U.S.C. 154(b) by 0 days.

(21) Appl. No.: 15/827,951

(22) Filed: Nov. 30, 2017

(65) Prior Publication Data

US 2018/0159454 A1 Jun. 7, 2018

(30) Foreign Application Priority Data

Dec. 1, 2016 (DE) .................. 10 2016 123 261

(51) Int. Cl.
| | |
|---|---|
| H02P 23/14 | (2006.01) |
| H02P 21/28 | (2016.01) |
| H02P 21/14 | (2016.01) |
| H02P 23/00 | (2016.01) |

(52) U.S. Cl.
CPC ............ H02P 21/28 (2016.02); H02P 21/141 (2013.01); *H02P 23/14* (2013.01)

(58) Field of Classification Search
CPC ...................................................... H02P 21/00
See application file for complete search history.

(56) References Cited

U.S. PATENT DOCUMENTS

| | | | | |
|---|---|---|---|---|
| 4,276,510 A | * | 6/1981 | Tompkins | G01R 15/185 324/117 R |
| 4,673,858 A | * | 6/1987 | Saito | H02P 27/047 318/798 |
| 5,170,116 A | * | 12/1992 | Bavard | H02P 21/141 318/798 |
| 5,963,007 A | | 10/1999 | Toyozawa et al. | |
| 6,194,864 B1 | * | 2/2001 | Kinpara | H02P 21/12 318/805 |
| 9,112,436 B2 | | 8/2015 | Fujii et al. | |
| 2010/0237821 A1 | * | 9/2010 | Kitanaka | H02P 21/05 318/702 |
| 2014/0340010 A1 | * | 11/2014 | Matsuura | H02P 21/06 318/400.13 |

(Continued)

FOREIGN PATENT DOCUMENTS

| | | |
|---|---|---|
| DE | 2640622 C3 | 2/1982 |
| DE | 102009021823 A1 | 12/2010 |

(Continued)

OTHER PUBLICATIONS

Jeong et al., "Inductance Estimation of Electrically Excited Synchronous Motor via Polynomial Approximations by Lease Square Method," IEEE Transactions on Industry Applications, Mar./Apr. 2015, pp. 1526-1537, vol. 51, No. 2.

*Primary Examiner* — Bentsu Ro
(74) *Attorney, Agent, or Firm* — Dorsey & Whitney LLP

(57) ABSTRACT

A method for operating an electric machine comprises ascertaining an electric stator current of the electric machine, calculating a magnetic flux which is generated based on the ascertained electric stator current, and controlling a torque generated by means of the electric machine, as a function of the calculated magnetic flux.

12 Claims, 6 Drawing Sheets

(56) References Cited

U.S. PATENT DOCUMENTS

2016/0094166 A1* 3/2016 Diao .................. H02P 21/13
                                              318/400.21

FOREIGN PATENT DOCUMENTS

| DE | 102010003218 A1 | 9/2011 |
|----|-----------------|--------|
| DE | 102012216777 A1 | 4/2013 |
| DE | 102013207121 A1 | 10/2013 |
| DE | 102012221751 A1 | 5/2014 |
| EP | 0836270 B1 | 1/2004 |

* cited by examiner

METHOD AND APPARATUS FOR OPERATING AN ELECTRIC MACHINE, ELECTRIC MACHINE

CROSS-REFERENCE TO RELATED APPLICATION

This application claims priority to German Patent Application No. DE 10 2016 123 261.0 filed Dec. 1, 2016, entitled "Verfahren und Vorrichtung zum Betreiben einer elektrischen Maschine, elektrische Maschine und Computerprogramm," which is incorporated by reference herein, in the entirety and for all purposes.

FIELD

The present invention relates to a method and an apparatus for operating an electric machine and an electric machine.

BACKGROUND

Generally, motors in electric drive technology are based on the power of a current-carrying conductor in a magnetic field: the Lorentz force, or rather the law of induction.

The permanently excited synchronous motor is used, for example, for many applications. The primary advantages of these motors are the high efficiency, the high transient overload capacity, and excellent controllability, with comparatively compact dimensions.

The prior art is a field-oriented control of three-phase machines. Originally, the (magnetic) field-oriented control was developed in order to be able to control asynchronous machines just as dynamically as direct-current machines. In asynchronous machines, the magnetic field of the rotor is estimated. The stator current is impressed based on the angle of the magnetic field. With the aid of the Park transformation, the stator current may be divided into a field-generating component ($i_d$) and a torque-generating component ($i_q$).

The field-oriented control which was originally developed for asynchronous machines is now also being used in permanently excited synchronous machines. Here, the orientation of the magnetic field may be calculated directly from the angle of the rotor. It is also customary to weaken the magnetic field via the current component is in order to be able to achieve higher rotational speeds.

One parameter of a permanently excited synchronous motor is the torque constant $K_T$.

$$M(t) = K_T \cdot i_q(t)$$

The approximately proportional relationship between the torque-generating current $i_q$ and the torque M enables the good controllability. The current is therefore often used as a controlled variable in order to adjust the desired torque as a target variable.

This approximately proportional relationship is based on the Lorentz force in the current-carrying conductor. If the conductor runs perpendicular to the magnetic field, the following results:

$$F = B \cdot l \cdot I$$

where F is the force, l is the length of the conductor in the magnetic field, I is the current intensity, and B is the magnetic flux density.

Ferromagnetic metal sheets are generally used for conducting the magnetic flux. The advantage of these metal sheets is the good magnetic permeability. One disadvantage of metal sheets is saturation effects at high flux densities.

According to Ampere's law, the magnetic field strength H results from the current, the winding specifications, and the mechanical dimensions of a magnetic circuit without an air gap. A proportional relationship thereby results:

$$H = C_1 \cdot I$$

The constant $C_1$ describes the influence of the winding specifications and the mechanical dimensions.

The flux density B (of the magnetic circuit without an air gap) initially increases approximately proportionally to the current I. In the further progression, the slope decreases due to saturation; thus, the characteristic curve becomes increasingly flat.

If a magnetic circuit having an air gap is considered, the nonlinearity due to saturation decreases considerably.

This configuration, i.e., a magnetic circuit having an air gap, is found in electric motors. In a permanently excited synchronous machine, for example, the torque M(I) does not behave linearly due to saturation. This function is generally ascertained on a torque test stand.

An additional parameter of an electric motor is the winding inductance L.

The inductance is calculated from the flux linkage $\Psi$ and the current I.

$$L = \frac{\Psi}{I}$$

With $\Psi = N \cdot A \cdot B$, it follows that:

$$L = \frac{N \cdot A \cdot B}{I}$$

where N is the winding of the coil, A is an oriented surface, and B is the flux density.

If an inductor having saturation effects is operated about an operating point, the change in the linked flux $\Delta\Psi$ relative to the change in the current $\Delta I$ may differ from the value of the static inductance. For small changes about an operating point, the differential inductance $L_{diff}$ results from the increase in the tangent:

$$L_{diff} = A \cdot N \cdot \frac{dB}{dI} = C \cdot \frac{dB}{dH}$$

The increase in the magnetization characteristic curve, and thus the differential inductance, decreases with increasing stator current.

This effect should be considered when designing the current control circuit, since the differential inductance which is relevant from a control standpoint may definitely decrease to well less than half.

If the change in the differential inductance is not considered, the control loop may become unstable at high currents, or the full control loop bandwidth will not be achieved at low currents.

In the prior art, saturation effects are considered at two points, from a control standpoint.

The setpoint value of the current controller, the reference value, is no longer calculated linearly via the torque constant $K_T$ from the setpoint torque, i.e., the target value;

$$I_{setpoint} = \frac{1}{K_T} \cdot M_{setpoint}$$

rather, a stored, nonlinear characteristic curve is used instead for forming the reference value:

$$I_{setpoint} = f(M_{setpoint})$$

Generally, experimentally ascertained data points are stored tabularly and are interpolated linearly.

The proportional gain of the current controller Kr may be adjusted with respect to the nonlinear differential winding inductance. The following holds true as a very good approximation:

$$K_P(I) = C_2 \cdot L_{diff}(I)$$

Here as well, it is customary to store the differential inductance or the proportional gain of the current controller in a table as a function of the current.

The approaches according to the prior art have the following disadvantages:

The effects of the magnetic saturation due the stator current are considered at two points. Two tables are stored, which must also be ascertained and parameterized. This means double effort during ascertainment, as well as double effort during the online calculation of the algorithms. An online calculation takes place, for example, during the operation of an electric machine.

Unexamined Patent Application DE 10 2010 003 218 A1 shows a method for controlling and/or regulating a metering pump. Although this unexamined patent application mentions a magnetic flux, it does not specify further which flux is involved: rotor, stator, leakage, etc. The magnetic flux is used as an auxiliary value for describing the torque, without a formula describing a relationship.

Unexamined Patent Application DE 10 2013 207 121 A1 describes a method for how a motor may be operated primarily in a controlled manner: the setpoint currents id and iq are calculated from a torque setpoint value. From them, the necessary voltages vd and vq are also calculated and pre-controlled. This unexamined patent application does not deal with saturation effects.

Patent application DE 26 40 622 C3 describes a method for how the voltage of a DC intermediate circuit may be stabilized in the case of a network failure, in order to be able to accelerate as rapidly as possible when the network returns. During the interruption, the magnetic flux (rotor) of an asynchronous machine can be stabilized. In this patent application, the amplitude of the rotor flux is considered, not the amplitude of the stator flux.

Patent application EP 0 836 270 B1 describes a method for how saturation effects of the q-current may be reduced via an additional field-weakening d-current, so that a higher torque becomes possible. FIG. 16 of the patent application shows the relationship between the torque-generating current iq and the torque. In the saturation region, the torque may be increased via a field-weakening d-current. In reality, this is very small, since the additional d-current must also be applied, and the q-current must therefore generally be reduced. A linearization of the characteristic curve is not discussed.

In the known prior art, the two effects of saturation, i.e., the nonlinear relationship between the current and torque, and the reduction in the winding inductance due to saturation, are considered separately and are compensated for separately. This is not very efficient, more complicated, and more complex in terms of parameterization and in terms of the algorithms.

SUMMARY

The present invention provides a method and an apparatus for operating an electric machine, an electric machine which makes possible a more efficient operation.

According to one aspect, a method for operating an electric machine, comprises the steps:
 ascertaining an electric stator current of the electric machine,
 calculating a magnetic flux which is generated based on the ascertained electric stator current, and
 controlling a torque generated by means of the electric machine, as a function of the calculated magnetic flux.

According to another aspect, an apparatus for operating an electric machine comprises:
 an ascertainment device for ascertaining an electric stator current of the electric machine,
 a processor for calculating a magnetic flux which is generated based on the ascertained electric stator current, and
 a control device for controlling a torque generated by means of the electric machine, as a function of the calculated magnetic flux.

According to another aspect, an electric machine An electric machine comprises a rotor and a stator, current-measuring device for measuring an electric stator current, and a control loop for receiving the measured stator current as an input value and for subsequently calculating an torque, wherein the torque is compared to a specified setpoint torque, and wherein from a comparison difference a control value is calculated which ascertains a stator current to be impressed on the stator of the electric machine.

BRIEF DESCRIPTION OF THE DRAWINGS

The invention is explained in more detail below with reference to exemplary embodiments, in which.

DETAILED DESCRIPTION

Figure 1:
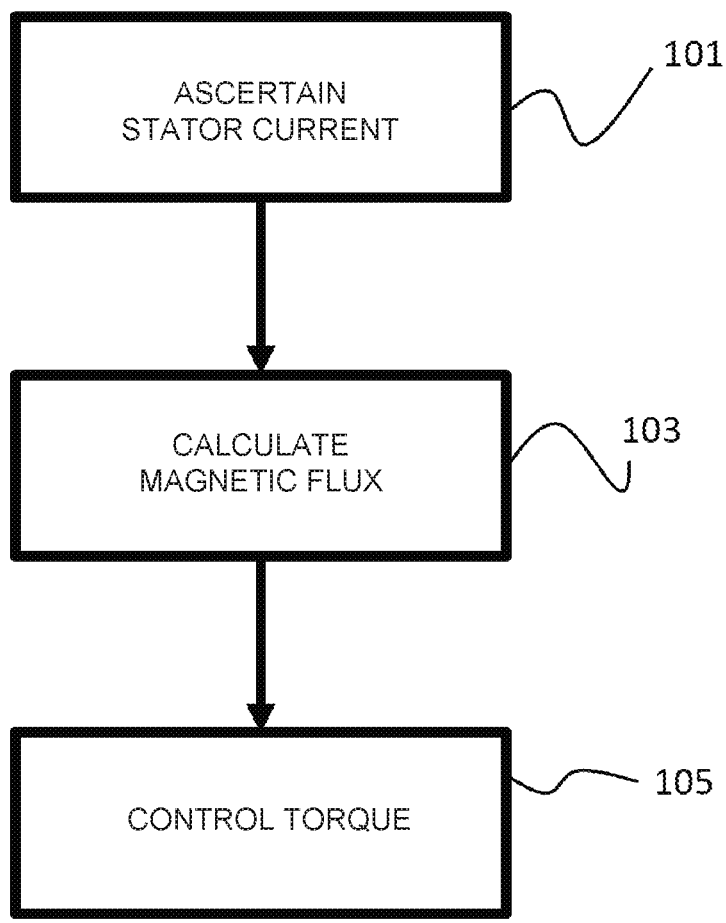
FIG. 1 shows a flow chart of a method for operating an electric machine.

The present invention is based on the finding that the aforementioned object may be achieved in that the magnetic flux $\phi_m(I)$ caused by the stator current, rather than the stator current I, is used as a controlled variable for controlling the torque as a target value.

As a result, the effects of the magnetic saturation due to the stator current may be efficiently taken into consideration, thus making the corresponding calculations and the corresponding control more efficient, so that as a result, the electric machine may be operated more efficiently.

In one embodiment, the electric machine is a three-phase machine, for example, an asynchronous machine or a synchronous machine, a direct-current machine, or a linear motor.

In one embodiment, it is provided that the calculation of the magnetic flux comprises approximating the magnetic flux by means of a polynomial which is of at least the second degree.

As a result, for example, the technical advantage is achieved that the magnetic flux may be efficiently calculated.

According to one embodiment, the degree of the polynomial is equal to three.

In another embodiment, it is provided that the polynomial is of the third degree and the absolute term of the polynomial is equal to zero.

As a result, for example, the technical advantage is achieved that the magnetic flux may be efficiently calculated.

In one embodiment, the polynomial is a Taylor polynomial.

According to another embodiment, it is provided that a differential inductance resulting from the corresponding stator current is measured in each case at different stator currents, wherein the coefficients of the polynomial are ascertained based on the measured differential inductances.

As a result, for example, the technical advantage is achieved that the coefficients of the polynomial may be efficiently calculated.

It is thus in particular provided to measure the corresponding differential inductances as a function of the stator current, via a variation of the operating point (different stator currents), wherein the coefficients are calculated from the differential inductances.

In one embodiment, it is provided that for ascertaining the coefficients, it is specified that the linear term of the polynomial is equal to 1 or is equal to the torque constant of the electric machine.

As a result, for example, the technical advantage is achieved that the coefficients of the polynomial may be efficiently calculated.

The ascertainment of the coefficients will be described below in greater detail by way of example, using a third-order polynomial (degree=3) and under the stipulation that the absolute term of the polynomial is equal to zero:

The polynomial is:

$$\phi_m(I) \approx b_1 \cdot I + b_2 \cdot I \cdot |I| + b_3 \cdot I^3$$

where $\phi_m$ is the magnetic flux, I is the stator current, and $b_1$, $b_2$, $b_3$ are the coefficients of the polynomial.

For reasons of symmetry, the function $\phi_m(I)$ is an odd (point-symmetric) function. $I^2$ has therefore been replaced by $I \cdot |I|$, and the coefficient $b_0$ (absolute term) is not required (=0). According to one embodiment, an approximation using a polynomial of a higher order is optionally provided.

If a characteristic curve having many experimentally ascertained data points is available, an approximation to a third-order polynomial may efficiently compensate for random measuring errors, and results in a smooth profile similar to a linear regression. In practice, an approximation to a second-order polynomial is sufficiently accurate, and is therefore provided according to one embodiment.

The coefficients are, for example, ascertained via curve fitting. An approximation of the curve (the polynomial) according to the method of least squares is particularly suitable and is therefore also thus provided according to one embodiment.

Advantageously and according to one embodiment, a simplification according to Horner's method (factoring out) is thus also provided:

$$\phi_m(I) \approx I \cdot (b_1 + |I| \cdot (b_2 + b_3 \cdot |I| + \ldots))$$

As a result, the number of required calculation operations (multiplication, addition) decreases.

One advantage of the polynomial is that the algorithm for calculation is less complex than an algorithm for linear interpolation of tabular data points. This applies both to a process-based implementation (for example, in the C programming language) and to a VHDL (very high-speed integrated circuit hardware description language) implementation, or rather a FPGA (field-programmable gate array) implementation, or an ASIC (application-specific integrated circuit) implementation.

In one embodiment, the apparatus has a function for creating, or rather depicting, a Bode diagram (Bode plot) of the control loops. Preferably, a frequency-dependent transfer function of the current control loop of the electric machine is measured open-loop and closed-loop in a small-signal range.

Preferably, the transfer function is measured for multiple, i.e., in particular for a series of, frequencies f or $\omega$, and, for example, is graphically depicted as an amplitude response (magnitude) and a phase response in the form of a Bode plot.

The open-loop amplitude response $|G_0(j\omega)|$ thus measured comprises the frequency-dependent transfer function of the controller $G_{controller}(j\omega)$ and of the controlled system $G_{controlled\ system}(j\omega)$.

Alternatively or in addition, according to one embodiment, it is provided that an open-loop transfer function $G_0(I)$ is measured at a constant frequency $\omega_1$ (this is the frequency which is also used below in the formula $$G_0(j\omega_1) \sim \frac{1}{L(I)})$$

and as a function of a current I (operating point) causing saturation.

Since the frequency remains unchanged, the transfer function of the controller does not change. As a result, the effect of the saturation on the controlled system may be measured in a simple manner.

The excitation for measurement takes place, for example, as a small signal, for example, sinusoidally at, for example, 500 Hz, about an operating point, defined by the current I.

Figure 6:
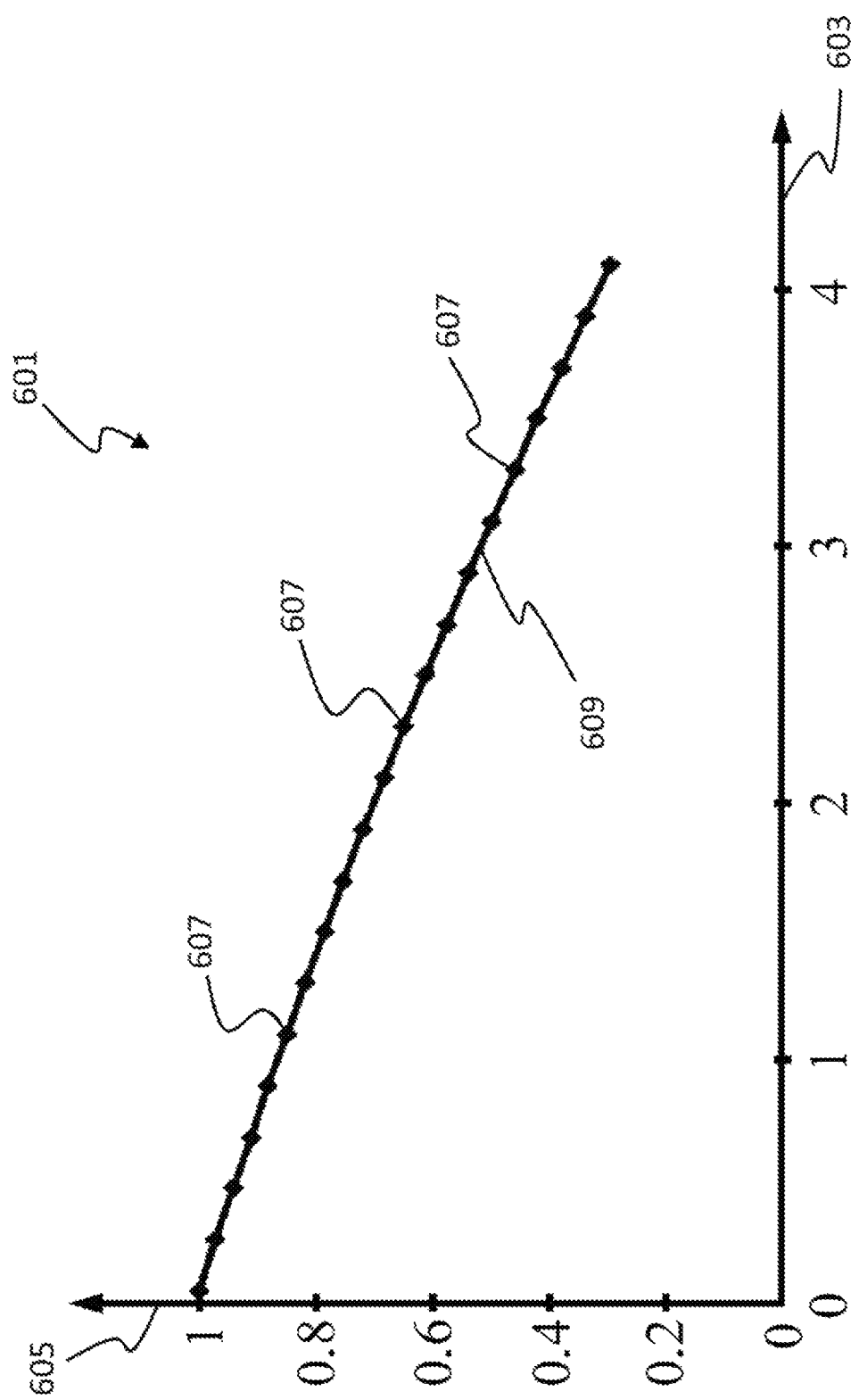
FIG. 6 shows a graph which shows a profile of a small-signal gain (of the controlled system), as a function of a stator current of the electric machine according to FIG. 5.

For example, FIG. 6 shows a graphical profile of the quotient $G_0(I_0)/G_0(In)$ over the current I (see also embodiments further below).

The following hold true:

$I_0$: Open-loop transfer function measured at $I_0$=0 A, and
$I_n$: Open-loop transfer function measured at a point 607.

An additional advantage is that a uniform approach may be used for the parameterization. A small-signal gain $K_{diff}$ of the characteristic curve may be calculated closed, according to the processing rules for polynomials, because an increase in the tangent at a point of the polynomial is proportional to the differential inductance:

$$K_{diff}(I) = \frac{d\phi_m(I)}{dI} = b_1 + 2 \cdot b_2 \cdot |I| + 3 \cdot b_3 \cdot I^2$$

For reasons of symmetry, the function $K_{diff}(I)$ must be an even (axis-symmetric) function. $I^1$ has therefore been replaced by $|I|$.

Dividing by $b_1$ results in:

$$\frac{K_{diff}(I)}{b_1} = \frac{b_1 + 2 \cdot b_2 \cdot |I| + 3 \cdot b_3 \cdot I^2}{b_1} = 1 + \frac{2 \cdot b_2}{b_1} \cdot |I| + \frac{3 \cdot b_3}{b_1} \cdot I^2 = \frac{L(I)}{L_0}$$

It is also possible, and according to one embodiment, it is also thus provided, to determine these coefficients $b_1$, $b_2$, $b_3$ within the scope of an automated parameter ascertainment in a comparatively simple manner, internally in the apparatus, or rather in the electric machine, without a test bench.

One possibility for determining the coefficients is the measurement of an open-loop current controller Bode plot with subsequent curve fitting:

$$G_0(j\omega_1) \sim \frac{1}{L(I)}$$

$G_0$ is calculated from $G_{controller}$ multiplied by $G_{controlled\ system}$:

$$G_{controlled\ system}(j\omega_1) = \frac{1}{R + j\omega_1 L_{diff}} \approx \frac{1}{j\omega_1 L_{diff}} \sim \frac{1}{L_{diff}}$$

By varying the operating point (I), the differential inductance $L_{diff}(I)$ may be measured as a function of the stator current I.

With the specification $b_1=1$, the coefficients $b_2$ and $b_3$ may be calculated in a particularly simple manner from the measured $L_{diff}(I)$ data.

Alternatively, $b_1 = K_T$ ($K_T$ is the torque constant of the electric machine without considering magnetic saturation) may also be specified before $b_2$ and $b_3$ are calculated.

In one embodiment, it is provided that the ascertained stator current is divided into a torque-generating current and into a field-generating current by means of the Park transformation, wherein for calculating the (torque-generating) magnetic flux, only the torque-generating current is used.

As a result, for example, the technical advantage is achieved that the magnetic flux may be efficiently calculated.

For calculating the magnetic flux, it is also in particular provided to ignore the field-generating current.

Experimental tests have surprisingly shown that the constant permanently excited flux (d-axis) which is perpendicular to the torque-generating flux (q-axis) may be ignored.

Magnetic leakage fields have an effect on the winding inductance, but not on the torque. Here as well, tests have surprisingly shown that these leakage fields may be ignored.

Thus, according to one embodiment, it is provided that in the embodiments made above and below, the stator current I may be replaced by the torque-generating current $I_q$.

In an additional embodiment, it is provided that a torque corresponding to the calculated magnetic flux is calculated, which, being an actual torque, is compared to a specified setpoint torque, wherein the control of the torque provided by means of the electric machine is carried out based on the comparison.

As a result, for example, the technical advantage is achieved that the control may be efficiently carried out.

In one embodiment, it is provided that the method for operating an electric machine is implemented or carried out by means of the apparatus for operating an electric machine.

In one embodiment, it is provided that the apparatus for operating an electric machine is configured to implement or carry out the method for operating an electric machine.

Technical functionalities of the method for operating an electric machine result analogously from corresponding technical functionalities of the apparatus for operating an electric machine, and vice-versa.

Apparatus features result analogously from corresponding method features, and vice-versa.

The formulation "or rather" comprises in particular the formulation "and/or."

FIG. 1 shows a flow chart of a method for operating an electric machine.

The method includes the following steps:
- ascertaining 101 an electric stator current of the electric machine,
- calculating 103 a magnetic flux which is generated based on the ascertained electric stator current, and
- controlling 105 a torque generated by means of the electric machine, as a function of the calculated magnetic flux.

In one embodiment, the ascertainment 101 comprises measuring the electric stator current of the electric machine. The ascertained stator current is based, for example, on the measured electric stator current. The ascertained stator current corresponds, for example, to the measured electric stator current.

The ascertained stator current corresponds, for example, to a current to be impressed on the stator.

In one embodiment, it is provided that the ascertained stator current is divided into a torque-generating current and into a field-generating current by means of the Park transformation. In one embodiment, it is provided that only the torque-generating current is used for calculating the magnetic flux. The field-generating current is, for example, ignored.

Figure 2:
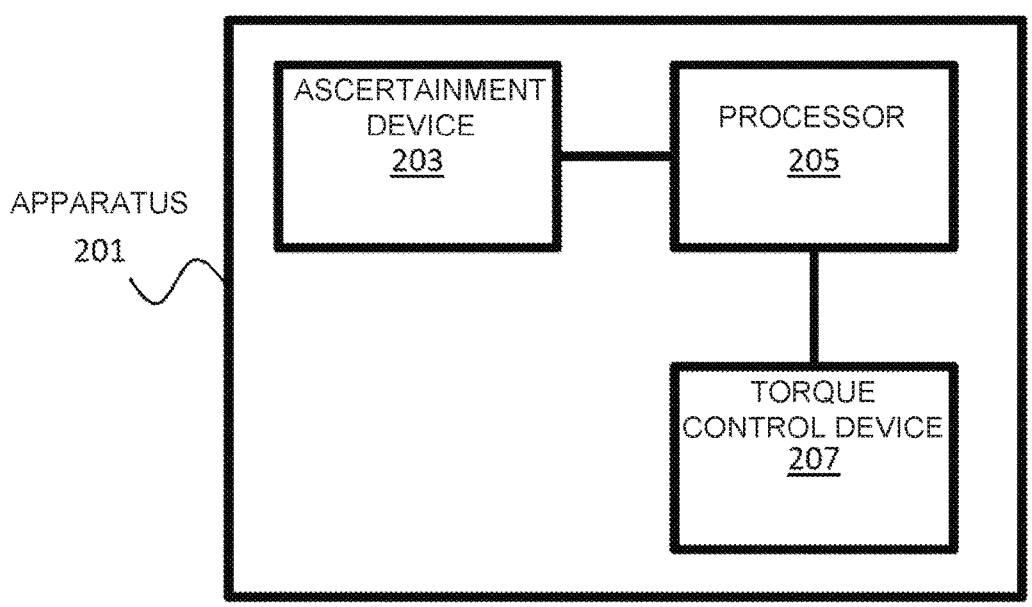
FIG. 2 shows an apparatus for operating an electric machine.

FIG. 2 shows an apparatus 201 for operating an electric machine. The apparatus 201 is, for example, a converter.

The apparatus 201 comprises:
- an ascertainment device 203 for ascertaining an electric stator current of the electric machine,
- a processor 205 for calculating a magnetic flux which is generated based on the ascertained electric stator current, and
- a control device 207 for controlling a torque generated by means of the electric machine, as a function of the calculated magnetic flux.

The ascertainment device 203 comprises, for example, a current-measuring device for measuring the electric stator current. The measuring device comprises, for example, a current sensor.

The apparatus 201 comprises, for example, an inductance-measuring device for measuring an inductance, or rather a differential inductance, which results from the electric stator current.

The processor 205 is, for example, configured to calculate the coefficients of a polynomial which approximates the magnetic flux which is generated based on the ascertained electric stator current, based on (for example, differential) inductances measured at different stator currents.

According to one embodiment, the control device 207 comprises the functional blocks 417 and 421 according to FIG. 4 (compare embodiments below).

In the context of the description, a combination made up of an electric machine and a converter may be referred to as a drive. For example, a combination made up of a three-phase machine and a converter may be referred to as a three-phase drive.

Figure 3:
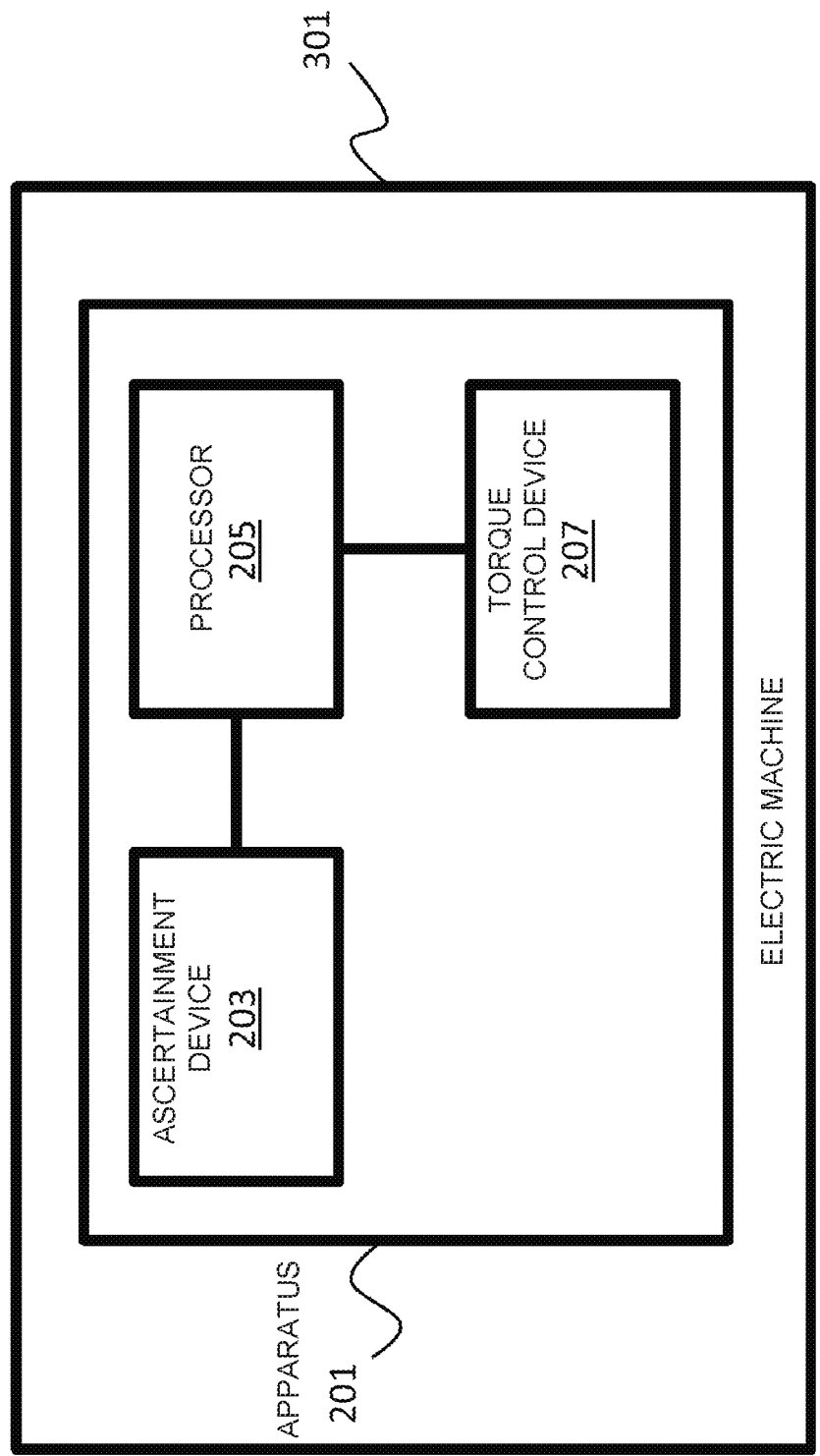
FIG. 3 shows an electric machine.

FIG. 3 shows an electric machine 301.

The electric machine 301 comprises the apparatus 201 of FIG. 2. As described above, the arrangement shown in FIG. 3 may be referred to as a drive.

Electric machines as such are known to those skilled in the art. Therefore, details, for example, an armature and a rotor of the electric machine 301, are not depicted.

An electric machine in the context of the description thus comprises in particular a rotor and a stator.

The stator comprises in particular one or more coils.

The rotor comprises in particular one or more coils and/or one or more permanent magnets.

Figure 4:
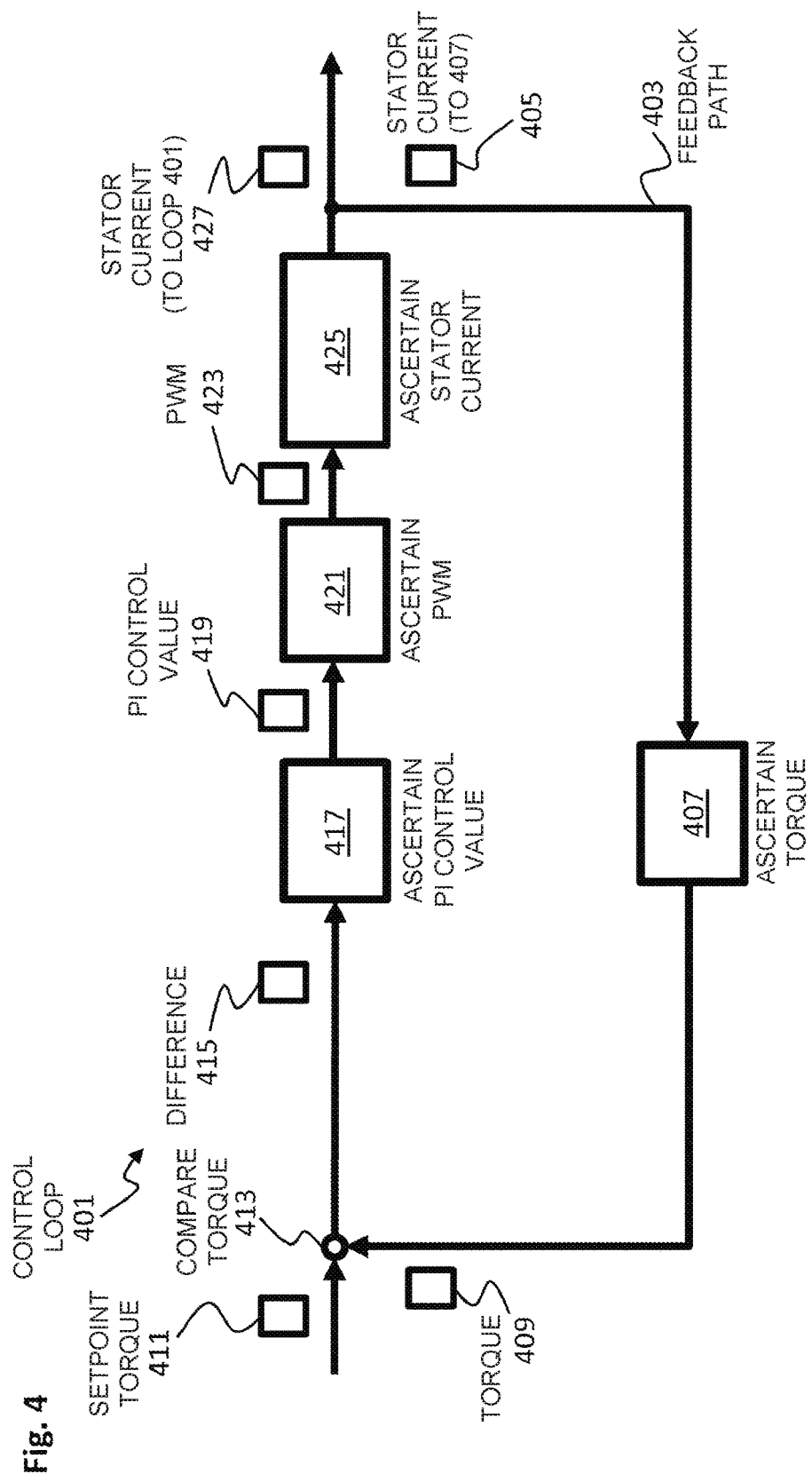
FIG. 4 shows a block diagram of a control loop.

FIG. 4 shows a block diagram of a control loop 401 which is used according to one embodiment for controlling a torque generated by means of an electric machine.

In a feedback path 403 of the control loop 401, according to a functional block 407, an ascertained electric stator current 405, which may also be referred to by I in the context of the description, is converted into a magnetic flux $\phi_m$, or rather into a torque M. For this purpose, for example, a polynomial is used to approximate the magnetic flux. For example, the polynomial is of the third degree.

For example, it is provided that the electric stator current is divided into a torque-generating current, which may also be referred to by $I_q$ in the context of the description, and into a field-generating current, which may also be referred to by $I_d$ in the context of the description, using the Park transformation. In the calculations above and below, in this respect, according to one embodiment, the stator current I is replaced by the torque-generating current $I_q$.

In the context of this description, it is, for example, assumed that in a first approximation, the magnetic flux is proportional to the torque M which is provided by means of the electric machine. Thus, for example, the following relationship holds true:

$$M(I) = C_m \cdot \phi_m(I),$$

where $C_m$ is a torque constant of the electric machine.

The stator current is thus initially converted in the feedback path 403 into the associated torque-proportional magnetic flux, or rather into a torque, so that the nonlinear formation of a desired variable $$I_{setpoint} = f(M_{setpoint})$$

may be replaced by a linear calculation:

$$\phi_{m,setpoint} = \frac{1}{C_m} \cdot M_{setpoint}$$

In the apparatus, or rather in the electric machine, for example, a respective characteristic curve is stored for $\phi_m(I)$ and/or $M(I)$.

A particular advantage of the concept according to the present invention is in particular that via this $\phi_m(I)$, or rather $M(I)$ characteristic curve, the current-dependent saturation of the inductance is also simultaneously considered. Exactly as the differential inductance decreases with increasing current, a small-signal gain $K_{diff}$ of the $\phi_m(I)$ characteristic curve also decreases accordingly:

$$K_{diff}(I) = \frac{d\phi_m(I)}{dI}$$

An additional current-dependent adaptation of a current regulator Kr for controlling an electric stator current is no longer required. In one exemplary field-oriented control of the multiphase motor of the electric machine, the torque-generating current $I_q$ is accordingly converted into a magnetic flux, or rather into a torque.

Figure 5:
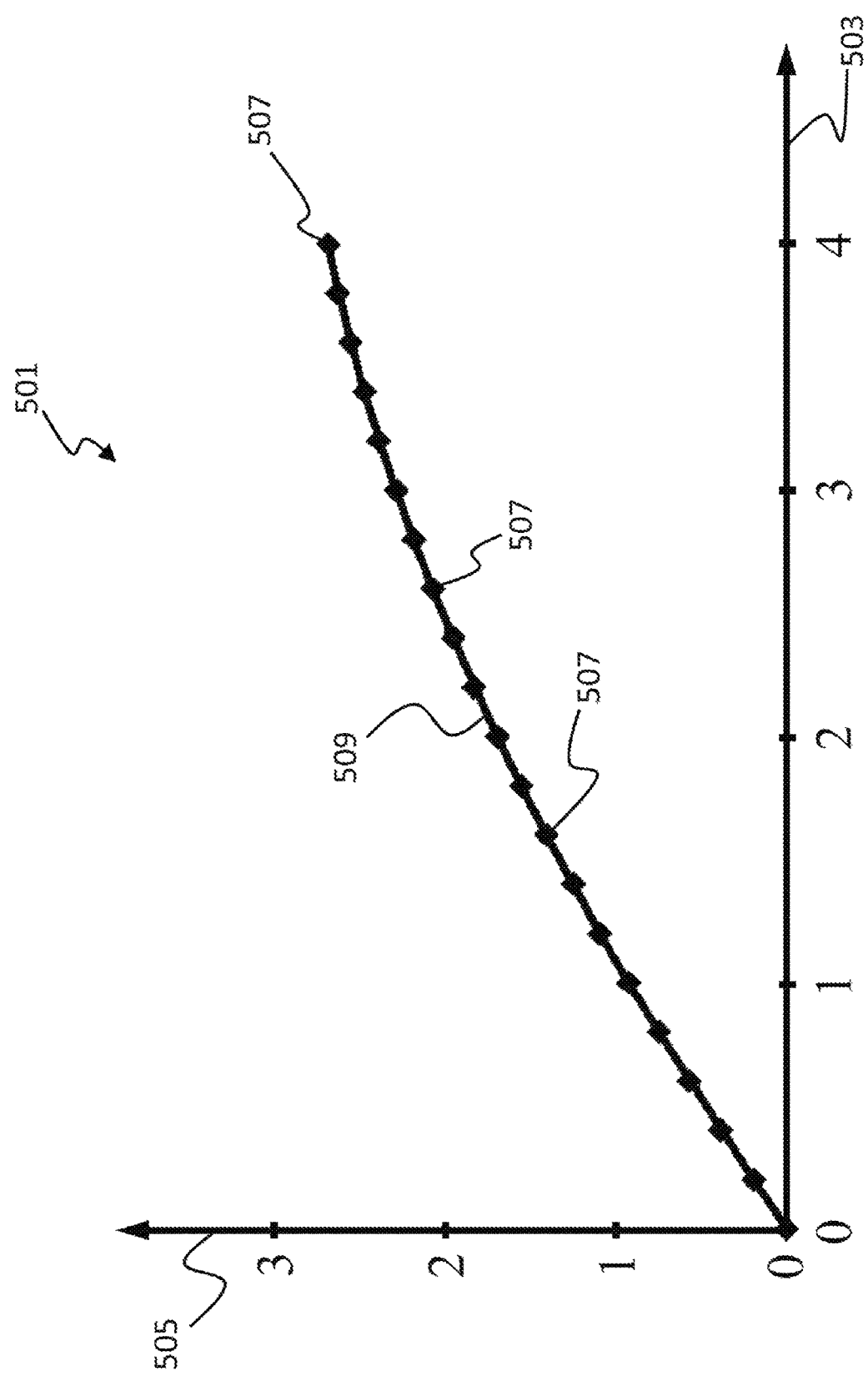
FIG. 5 shows a graph which shows a profile of a torque generated by means of an electric machine, as a function of a stator current of the electric machine.

Using a third-order polynomial, it will be described in greater detail how these characteristic curves are calculated or ascertained according to one embodiment for $\phi_m(I)$ and/or $M(I)$, wherein FIGS. 5 and 6 are used for further explanation.

In one embodiment, it is provided that the function $\phi_m(I)$ is approximated by means of a third-order polynomial (degree=3), wherein it is further specified that the absolute term $b_0$ of the polynomial is equal to zero.

$$\phi_m(I) \approx b_1 \cdot I + b_2 \cdot I \cdot |I| + b_3 \cdot I^3$$

where $\phi_m$ is the magnetic flux, I is the stator current, and $b_1$, $b_2$, $b_3$ are the coefficients of the polynomial.

For reasons of symmetry, the function $\phi_m(I)$ is an odd (point-symmetric) function. $I^2$ has therefore been replaced by $I \cdot |I|$, and the coefficient $b_0$ (absolute term) is not required (=0). According to one embodiment, an approximation using a polynomial of a higher order is optionally provided.

If a characteristic curve having many experimentally ascertained data points is available, an approximation to a third-order polynomial may efficiently compensate for random measuring errors, and results in a smooth profile similar to a linear regression. In one embodiment, a second-order polynomial is used for the approximation.

The coefficients of the polynomial are, for example, ascertained via curve fitting. An approximation of the curve (the polynomial) according to the method of least squares is particularly suitable and is therefore also thus provided according to one embodiment.

Advantageously and according to one embodiment, a simplification according to Horner's method (factoring out) is thus also provided:

$$\phi_m(I) \approx I \cdot (b_1 + |I| \cdot (b_2 + b_3 \cdot |I| + \ldots))$$

As a result, the number of required calculation operations (multiplication, addition) decreases in an efficient manner.

One advantage of the polynomial is that the algorithm for the calculation is less complex than an algorithm for the linear interpolation of tabular data points. This applies both to a process-based implementation (for example, in the C programming language) and to a VHDL (very high-speed integrated circuit hardware description language) implementation, or rather a FPGA (field-programmable gate array) implementation, or an ASIC (application-specific integrated circuit) implementation.

An additional advantage is that a uniform approach may advantageously be used for the parameterization. The small-signal gain $K_{diff}$ of the characteristic curve may be calculated closed, according to the processing rules for polynomials:

$$K_{diff}(I) = \frac{d\phi_m(I)}{dI} = b_1 + 2 \cdot b_2 \cdot |I| + 3 \cdot b_3 \cdot I^2$$

For reasons of symmetry, the function $K_{diff}(I)$ must be an even (axis-symmetrical) function. $I^1$ has therefore been replaced by $|I|$.

Dividing by $b_1$ results in:

$$\frac{K_{diff}(I)}{b_1} = \frac{b_1 + 2 \cdot b_2 \cdot |I| + 3 \cdot b_3 \cdot I^2}{b_1} = 1 + \frac{2 \cdot b_2}{b_1} \cdot |I| + \frac{3 \cdot b_3}{b_1} \cdot I^2 = \frac{L(I)}{L_0}$$

Within the scope of an automated parameter ascertainment, the determination of these coefficients $b_1$, $b_2$, $b_3$ is also possible internally in the apparatus, or rather in the electric machine, in a comparatively simple manner, without a test bench.

One possibility for determining the coefficients is the measurement of an open-loop current controller Bode plot with subsequent curve fitting:

$$G_0(j\omega_1) \sim \frac{1}{L(I)}$$

By varying the operating point (I), the differential inductance $L_{diff}(I)$ may be measured as a function of the stator current I.

With the specification $b_1=1$, the coefficients $b_2$ and $b_3$ may be calculated in a particularly simple manner from the measured $L_{diff}(I)$ data.

Alternatively, $b_1=K_T$ ($K_T$ is a torque constant of the electric machine) may also be specified before $b_2$ and $b_3$ are calculated.

Thus, in the case of different stator currents, it is provided to measure the resulting differential inductances, in order to accordingly calculate the coefficients of the polynomial. Subsequently, the accordingly ascertained characteristic curves are available, in order, with knowledge of the electric stator current of the electric machine, to ascertain the associated torque, as is carried out in functional block 407.

The functional block 407 thus receives the ascertained stator current 405 as an input value and, as described above, subsequently calculates the associated torque, which is indicated symbolically in FIG. 4 as a box having the reference numeral 409 and which may also be denoted by $\hat{M}$.

According to a functional block 413, the torque $\hat{M}$ is compared to a specified setpoint torque M*, denoted in FIG. 4 as a box having the reference numeral 411. A difference ΔM, which may also be zero and which is indicated in FIG. 4 as a box having the reference numeral 415, goes into a functional block 417, in which a PI control value 419, which may also be denoted by U*, is ascertained. "P" stands for "proportional" and "I" stands for "integral."

The PI control value is thus, for example, created via a PI controller. For example, other controllers, for example, a PID controller (proportional integral derivative controller), are provided.

The control device 207 according to FIG. 2 is, for example, configured as a PI controller or a PID controller, or comprises a PI controller or PID controller. For example, the control device 207, which, for example, comprises the functional blocks 417 and 421 according to FIG. 4 in one embodiment, generates a command for controlling the voltage of the electric machine. The command is, for example, ascertained based on the difference 415, preferably using a controller, for example, a PI controller or a PID controller.

The PI control value 419 is supplied to a functional block 421, which ascertains a pulse-width modulation value 423 which is based on the PI control value 419 and which may also be denoted by U.

The PWM value 423 is supplied to a functional block 425 which ascertains a stator current I to be impressed on the stator of the electric machine, based on the PWM value 423, said stator current being denoted in FIG. 4 as a box having the reference numeral 427. The stator current according to the box 427 is supplied as an input value to the functional block 407, so that the control loop 401 is run through again.

The ascertained stator current according to the box 427 is, for example, impressed on the stator of the electric machine.

For ascertaining the stator current according to the box 427, the following formula is used in the functional block 425:

$$I(s) = \frac{1}{R + Ls} \cdot U(s)$$

The term $$\frac{1}{R + Ls}$$

represents, for example, the transfer function of a motor winding in the Laplace domain.

The voltage of the PWM is provided as an input value. The current is provided as an output value. The induced voltage is not depicted here. The Laplace operated is denoted by "s".

The term $$\frac{1}{R + L_{diff} \cdot s}$$

is thus a modeling of the motor winding of an electric machine in the Laplace domain (also referred to as the image domain). The "s" is used due to the depiction in the Laplace domain. The motor winding constitutes a so-called PT1 element.

In control technology, the following depiction of transmission elements is generally used:

$$G_S = \frac{K_S}{1 + \tau \cdot s}$$

where $$K_S = \frac{1}{R}$$

and $$\tau = \frac{L}{R}$$

The prior art is in particular interpolated using a table:

$$\frac{1}{R + L_{diff} \cdot s}$$

where R is the electrical resistance of the stator, i.e., the coil of the stator; $L_{diff}$ is the differential inductance, and s is the Laplace operator.

The current control takes place via an adjustable voltage. In order to achieve proper efficiency, the voltage is generated via PWM (pulse width modulation). The small-signal behavior about the operating point is important for the stability of the control loop. Thus, the inductance Liar measured at the operating point is applied.

The core of the present invention thus comprises in particular the idea that for controlling the torque M as a target value, the magnetic flux $\phi_m(I)$ generated by the torque-generating current $I_q$, rather than the stator current I, is used as a controlled variable. The control loop 401 may thus in particular be referred to as a flux control loop, or rather a torque control loop, which advantageously takes saturation effects into consideration. The controlled variable of the control loop 401 is the magnetic flux, or rather the torque.

The concept according to the present invention has in particular the advantage that only one approximation, for example, by means of the polynomial, must be carried out in order to efficiently take the saturation effects into consideration. In contrast, two different interpolations are required in the prior art.

An additional advantage may thus in particular be seen in the fact that, for considering the saturation effects, only one characteristic curve must be ascertained. In contrast, in the known prior art, two different characteristic curves must be ascertained.

A resulting advantage is in particular to be seen in a reduction in the processor load. In particular, memory may advantageously be saved by storing only one characteristic curve, compared to storing two characteristic curves.

FIG. 5 shows a graph 501 which shows a profile of a torque generated by means of an electric machine, as a function of a stator current of the electric machine.

The abscissa 503 indicates the electric stator current in amperes. The ordinate 505 indicates the torque in Nm.

The experimentally ascertained torques at different stator currents are indicated as squares having the reference numeral 507.

The experimentally ascertained torques are approached or approximated by a curve which has the reference numeral 509. The curve 509 is a third-order polynomial and has the following coefficients, wherein $b_1=1.0$ is fixedly specified:

$b_0=0$; $b_1=1.0$; $b_2=-0.07$ and $b_3=-0.003$.

The approximation of the experimentally ascertained torques is, for example, carried out using the method of least squares. For this purpose, the resulting differential inductances were measured at different stator currents (cf. FIG. 6 and associated description), and the approximation was used that the torque is proportional to the magnetic flux.

FIG. 6 shows a graph which shows a profile of a small-signal gain $K_{diff}$ as a function of a stator current of the electric machine which was used in conjunction with FIG. 5 to ascertain the dependence of the torque on the stator current.

The abscissa 603 indicates the electric stator current in amperes. The ordinate 605 indicates the relative small-signal gain in relation to the small-signal gain at I=0 A ($K_{diff}$ (I=0 A)=1).

The experimentally ascertained values for the small-signal gain at different stator currents are indicated as squares having the reference numeral 607. As described above, it holds true that $$\frac{K_{diff}(I)}{b_1} = \frac{b_1 + 2 \cdot b_2 \cdot |I| + 3 \cdot b_3 \cdot I^2}{b_1} = 1 + \frac{2 \cdot b_2}{b_1} \cdot |I| + \frac{3 \cdot b_3}{b_1} \cdot I^2 = \frac{L(I)}{L_0}$$

so that by measuring the differential inductance at different operating points (I) and under the (exemplary) stipulation that $b_1=1.0$, the small-signal gain may be experimentally ascertained at different stator currents.

The experimentally ascertained values for the small-signal gain are approached or approximated via a curve which has the reference numeral 609. The curve 609 corresponds to a second-order polynomial which is the derivative with respect to the stator current of the third-order polynomial according to FIG. 5:

$$K_{diff}(I) = \frac{d\phi_m(I)}{dI} = b_1 + 2 \cdot b_2 \cdot |I| + 3 \cdot b_3 \cdot I^2$$

The coefficients of this polynomial are thus the following coefficients:

$b_0=0$; $b_1=1.0$; $b_2=-0.07$ and $b_3=-0.003$.

Thus, it is advantageously made possible that the coefficients may be efficiently determined or ascertained internally in the electric machine, without a test bench, by varying the operating point and measuring the corresponding differential inductances.

In summary, the present invention provides an efficient concept which considers, addresses, and compensates for the two effects of the saturation together: the nonlinear relationship between the stator current and the torque, and the reduction in the winding inductance due to saturation, so that corresponding parameterizations and algorithms may be simply and efficiently designed, compared to the known prior art, which separately considers and separately compensates for the two effects of the saturation.

What is claimed is:

1. A method for operating an electric machine, comprising the steps:
    ascertaining an electric stator current of the electric machine,
    calculating a magnetic flux which is generated based on the ascertained electric stator current, the calculating of the magnetic flux comprising approximating the magnetic flux by means of a polynomial which is of at least the second degree, and
    controlling a torque generated by means of the electric machine, as a function of the calculated magnetic flux.

2. The method as claimed in claim 1, wherein the polynomial is of the third order and the absolute term of the polynomial is equal to zero.

3. The method as claimed in claim 1, wherein a differential inductance resulting from the corresponding stator current is measured in each case at different stator currents, wherein the coefficients of the polynomial are ascertained based on the measured differential inductances.

4. The method as claimed in claim 3, wherein for ascertaining the coefficients, it is specified that the linear term of the polynomial is equal to 1 or is equal to the torque constant of the electric machine.

5. A method for operating an electric machine, comprising the steps:
    ascertaining an electric stator current of the electric machine,
    calculating a magnetic flux which is generated based on the ascertained electric stator current, the ascertained stator current being divided into a torque-generating current and into a field-generating current by means of the Park transformation, wherein for calculating the magnetic flux, only the torque-generating current is used, and controlling a torque generated by means of the electric machine, as a function of the calculated magnetic flux.

6. A method for operating an electric machine, comprising the steps:

ascertaining an electric stator current of the electric machine, calculating a magnetic flux which is generated based on the ascertained electric stator current, and controlling a torque generated by means of the electric machine, as a function of the calculated magnetic flux, wherein an actual torque corresponding to the calculated magnetic flux is calculated, which, is compared to a specified setpoint torque, wherein the control of the torque generated by means of the electric machine is carried out based on the comparison.

7. An apparatus for operating an electric machine, comprising:

an ascertainment device for ascertaining an electric stator current of the electric machine, a processor for calculating a magnetic flux which is generated based on the ascertained electric stator current, the processor being configured to calculate the coefficients of a polynomial which approximates the magnetic flux which is generated based on the ascertained electric stator current, based on inductances measured at different stator currents, and a control device for controlling a torque generated by means of electric machine, as a function of the calculated magnetic flux.

8. The apparatus for operating an electric machine as claimed in claim 7, wherein the ascertainment device comprises a current-measuring device for measuring the electric stator current.

9. The apparatus for operating an electric machine as claimed in claim 7, comprising an inductance-measuring device for measuring the inductance, which results from the electric stator current.

10. The apparatus for operating an electric machine as claimed in claim 7, being a converter.

11. An electric machine comprising:

a rotor and a stator, a current-measuring device for measuring an electric stator current, and a control loop for receiving the measured stator current as an input value and for subsequently calculating a torque, wherein the torque is compared to a specified setpoint torque, wherein based on a comparison difference a control value is calculated which ascertains a stator current to be impressed on the stator of the electric machine, wherein the control loop comprises a functional block for generating a PI control value or a PID control value based on the comparison difference, a functional block for ascertaining a pulse-width modulation value based on the PI control value PID control value and a functional block for ascertaining the stator current based on the pulse-width modulation value.

12. The electric machine as claimed in claim 11, wherein the control loop comprises a functional block for calculating the torque and a functional block for comparing the torque to the specified setpoint torque.

* * * * *